(12) United States Patent
Bae et al.

(10) Patent No.: US 11,260,738 B2
(45) Date of Patent: Mar. 1, 2022

(54) HSG COOLING CONTROL APPARATUS FOR HYBRID VEHICLE, HSG COOLING CONTROL METHOD THEREOF, AND HYBRID VEHICLE INCLUDING HSG COOLING CONTROL APPARATUS

(71) Applicants: HYUNDAI MOTOR COMPANY, Seoul (KR); KIA MOTORS CORPORATION, Seoul (KR)

(72) Inventors: Jin Geun Bae, Daegu (KR); Joong Woo Lee, Yongin-si (KR); Man Jae Park, Hwaseong-si (KR); Myung Won Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 388 days.

(21) Appl. No.: 16/588,531

(22) Filed: Sep. 30, 2019

(65) Prior Publication Data

US 2020/0338976 A1 Oct. 29, 2020

(30) Foreign Application Priority Data

Apr. 24, 2019 (KR) .......................... 10-2019-0047814

(51) Int. Cl.
*B60K 11/02* (2006.01)
*B60K 6/26* (2007.10)
(Continued)

(52) U.S. Cl.
CPC ................ *B60K 6/26* (2013.01); *B60K 6/387* (2013.01); *B60K 11/02* (2013.01); *B60W 20/00* (2013.01);
(Continued)

(58) Field of Classification Search
CPC .......... B60K 6/26; B60K 6/387; B60K 11/02; B60K 2006/4825; B60K 6/442; B60W 20/00; B60W 2510/0638; B60W 2510/0208; B60W 2510/081; B60W 2510/083; B60W 2510/087; B60W 10/30;
(Continued)

(56) References Cited

U.S. PATENT DOCUMENTS

2001/0018903 A1* 9/2001 Hirose .................. F02D 41/042
123/179.4
2009/0171523 A1* 7/2009 Luo ....................... B60W 10/02
701/22
(Continued)

*Primary Examiner* — David J Hlavka
(74) *Attorney, Agent, or Firm* — Morgan, Lewis & Bockius LLP

(57) ABSTRACT

A hybrid starter and generator (HSG) cooling control apparatus for a hybrid vehicle, and an HSG cooling control method thereof, the apparatus includes a receiver configured to receive driving information of an engine and a hybrid starter and generator (HSG), a cooling unit configured to cool the HSG, and a controller configured to control the cooling unit, wherein the controller determines whether the HSG is in an idle charging mode based on driving information of the engine and the HSG, determines whether the temperature of the HSG is greater than a first cooling-required temperature when the HSG is in the idle charging mode, and controls the cooling unit to be turned on when the temperature of the HSG is greater than the first cooling-required temperature.

20 Claims, 5 Drawing Sheets

(51) Int. Cl.
*B60K 6/387* (2007.10)
*B60W 20/00* (2016.01)

(52) U.S. Cl.
CPC .. *B60W 2510/0638* (2013.01); *B60Y 2200/92* (2013.01); *B60Y 2306/05* (2013.01)

(58) Field of Classification Search
CPC .. B60W 30/1843; B60W 10/08; B60W 40/00; B60W 10/02; B60Y 2200/92; B60Y 2306/05
See application file for complete search history.

(56) References Cited

U.S. PATENT DOCUMENTS

| | | | | |
|---|---|---|---|---|
| 2012/0081070 | A1* | 4/2012 | Wook | B60W 10/08 320/109 |
| 2012/0245781 | A1* | 9/2012 | Kanamori | B60L 58/24 701/22 |
| 2016/0082945 | A1* | 3/2016 | Kim | B60W 10/26 701/22 |

* cited by examiner

HSG COOLING CONTROL APPARATUS FOR HYBRID VEHICLE, HSG COOLING CONTROL METHOD THEREOF, AND HYBRID VEHICLE INCLUDING HSG COOLING CONTROL APPARATUS

This application claims the benefit of priority to Korean Patent Application No. 10-2019-0047814, filed on Apr. 24, 2019, which is hereby incorporated by reference.

TECHNICAL FIELD

The present disclosure relates to a hybrid starter and generator (HSG) cooling control apparatus for a hybrid vehicle, and more particularly to an HSG cooling control apparatus for a hybrid vehicle, an HSG cooling control method thereof, and a hybrid vehicle including the apparatus, for control of cooling of the HSG based on an idle charging condition of the HSG.

BACKGROUND

In general, a hybrid electric vehicle (HEV) is a vehicle that uses two power sources, in most cases an engine and an electric motor.

An HEV has excellent fuel efficiency and engine performance compared with a vehicle including only an internal combustion engine and is also advantageous for lowering exhaust gas, and thus has been actively developed recently.

Such a hybrid vehicle travels in two modes based on which powertrain is used to drive the vehicle.

One of the modes is an electric vehicle (EV) mode in which the vehicle travels using only an electric motor and the other mode is a hybrid electric vehicle (HEV) mode of operating both an electric motor and an engine to acquire power.

A hybrid vehicle may be classified into various types of vehicles according to the manner in which an engine, a motor, a transmission, and a clutch are combined.

Among them, a hybrid vehicle that employs a transmission mounted electric device (TMED) system using an engine, two motors, and one clutch is configured in such a way that a main power motor is combined with the transmission to be partially or entirely responsible for providing power in the case of driving in HEV/EV modes, and an auxiliary power motor and an engine are combined to charge a high-voltage battery using a forcibly driven engine in the state in which the engine is turned on and off or is in an idle state during transition between HEV and EV modes.

Here, a hybrid starter and generator (HSG), which is an auxiliary power motor, generates a large amount of heat during the driving and regeneration operations of a hybrid vehicle, and in order to cool the HSG, a flow channel is configured with an inverter, and the temperature of the HSG is controlled using an electric water pump (EWP) and a coolant.

However, the HSG allows current to flow in a coil to form an electromagnet and uses magnetic repulsive force based on the electromagnet, and during this procedure, heat is generated from a coil and the coil is susceptible to heat damage to thus reduce the service life thereof.

Such heat damage to a coil includes damage to an impregnating material and a coating material due to exposure to high temperatures, and damage from cracking of a coil surface and dielectric breakdown of the coil due to repeated temperature variation between high and low temperatures.

Accordingly, in the future, there is a need to develop an HSG cooling control apparatus for a hybrid vehicle for overcoming a problem in which the temperature variation of the HSG is repeatedly generated to thus reduce a service life.

SUMMARY

Accordingly, the present disclosure is directed to a hybrid starter and generator (HSG) cooling control apparatus for a hybrid vehicle, an HSG cooling control method thereof, and a hybrid vehicle including the HSG cooling control apparatus that substantially obviates one or more problems due to limitations and disadvantages of the related art.

An objective of the present disclosure is to provide a hybrid starter and generator (HSG) cooling control apparatus for a hybrid vehicle, an HSG cooling control method thereof, and a hybrid vehicle including the apparatus, for differently determining an idle charging mode and a driving mode of the HSG and performing cooling control corresponding to the idle charging mode or cooling control corresponding to the driving mode to thus increase the service life of the HSG.

Additional advantages, objectives, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objectives and other advantages and in accordance with the purpose of the present disclosure, as embodied and broadly described herein, a hybrid starter and generator (HSG) cooling control apparatus for a hybrid vehicle includes a receiver configured to receive driving information of an engine and a hybrid starter and generator (HSG), a cooling unit configured to cool the HSG, and a controller configured to control the cooling unit, wherein the controller determines whether the HSG is in an idle charging mode based on driving information of the engine and the HSG, determines whether a temperature of the HSG is greater than a first cooling-required temperature when the HSG is in the idle charging mode, and controls the cooling unit to be turned on when the temperature of the HSG is greater than the first cooling-required temperature.

When determining whether the HSG is in the idle charging mode, the controller may check whether the temperature of the HSG is greater than a second cooling-required temperature when the HSG is not in the idle charging mode, and the controller may control the cooling unit to be turned on when the temperature of the HSG is greater than the second cooling-required temperature.

When checking whether the temperature of the HSG is greater than the second cooling-required temperature, the controller may control the cooling unit to be turned off when the temperature of the HSG is not greater than the second cooling-required temperature.

When determining whether the temperature of the HSG is greater than the first cooling-required temperature, the controller may control the cooling unit to be turned off when the temperature of the HSG is not greater than the first cooling-required temperature.

In another aspect of the present disclosure, a hybrid starter and generator (HSG) cooling control method for a hybrid vehicle including a receiver and a controller for control of driving of a cooling unit includes receiving driving information of an engine and an HSG, by the receiver, determining whether the HSG is in an idle charging mode based on driving information of the engine and the HSG, by the controller, determining whether a temperature of the HSG is greater than a first cooling-required temperature when the HSG is in the idle charging mode, by the controller, and controlling the cooling unit to be turned on when the temperature of the HSG is greater than the first cooling-required temperature.

The determining whether the HSG is in the idle charging mode may include checking whether the temperature of the HSG is greater than a second cooling-required temperature when the HSG is not in the idle charging mode, and controlling the cooling unit to be turned on when the temperature of the HSG is greater than the second cooling-required temperature.

The checking whether the temperature of the HSG is greater than the second cooling-required temperature may include controlling the cooling unit to be turned off when the temperature of the HSG is not greater than the second cooling-required temperature.

The checking whether the temperature of the HSG is greater than the first cooling-required temperature may include controlling the cooling unit to be turned off when the temperature of the HSG is not greater than the first cooling-required temperature.

In another aspect of the present disclosure, a computer readable recording medium has recorded thereon a program for executing a hybrid starter and generator (HSG) cooling control method for a hybrid vehicle.

In another aspect of the present disclosure, a hybrid vehicle including a hybrid starter and generator (HSG) cooling control apparatus includes a hybrid power source including a motor, an engine, and a hybrid starter and generator (HSG), and an HSG cooling control apparatus configured to control cooling of the HSG, wherein the HSG cooling control apparatus includes a receiver configured to receive driving information of the engine and the HSG, a cooling unit configured to cool the HSG, and a controller configured to determine whether the HSG is in an idle charging mode based on driving information of the engine and the HSG, to determine whether the temperature of the HSG is greater than a first cooling-required temperature when the HSG is in the idle charging mode, and to control the cooling unit to be turned on when the temperature of the HSG is greater than the first cooling-required temperature.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
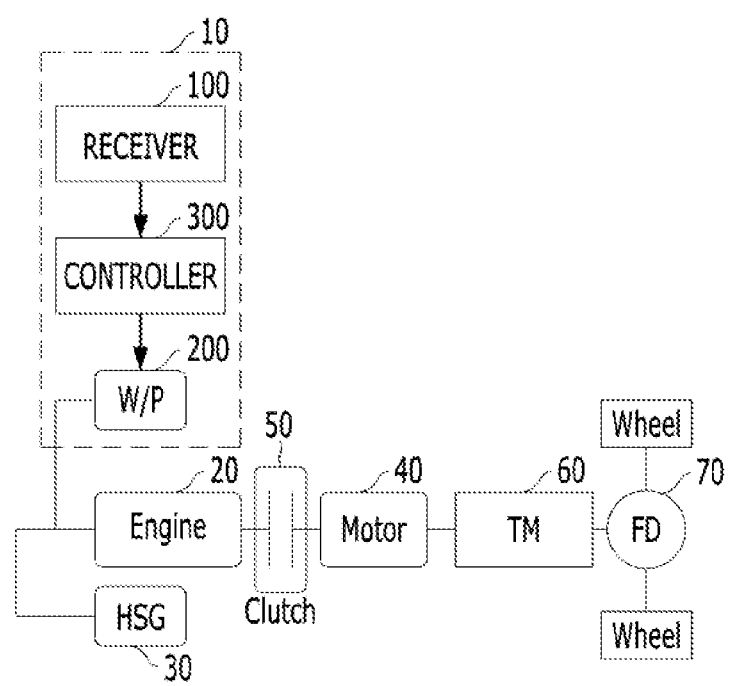
FIG. 1 is a schematic diagram for explanation of a transmission mounted electric device (TMED) system of a hybrid vehicle including a hybrid starter and generator (HSG) cooling control apparatus according to an exemplary embodiment of the present disclosure.

Exemplary embodiments of the present disclosure are described in detail so as for those of ordinary skill in the art to easily implement the invention with reference to the accompanying drawings. However, the present disclosure may be implemented in various different forms and is not limited to these embodiments. To clearly describe the present disclosure, parts unrelated to the description are omitted in the drawings and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

Hereinafter, a hybrid starter and generator (HSG) cooling control apparatus for a hybrid vehicle, an HSG cooling control method thereof, and a hybrid vehicle including the HSG cooling control apparatus, to which embodiments of the present disclosure are applicable, will be described in detail with reference to FIGS. 1 to 5.

FIG. 1 is a schematic diagram for explanation of a transmission mounted electric device (TMED) system of a hybrid vehicle including an HSG cooling control apparatus according to an exemplary embodiment of the present disclosure.

As shown in FIG. 1, the hybrid vehicle according to the present disclosure may include a hybrid power source including a motor 40, an engine 20, and a hybrid starter and generator (HSG) 30, and an HSG cooling control apparatus 10 for control of cooling of the HSG 30.

The hybrid vehicle may include a powertrain including the hybrid power source.

Here, the powertrain may employ a parallel type hybrid system in which the motor 40 and an engine clutch 50 are installed between the engine 20, typically an internal combustion engine and a transmission 60.

In general, in the hybrid vehicle, when a driver depresses an accelerator pedal after the vehicle is turned on, the motor 40 is driven using the power of a battery in the state in which the engine clutch 50 is open, and then the power of the motor 40 is transferred to the transmission 60 and a final drive (FD) 70 to move the wheels (i.e., EV mode).

When gradually increased driving force is required as the hybrid vehicle is gradually accelerated, the HSG 30 may be operated to drive the engine 20.

Accordingly, when the engine 20 and the motor 40 have the same rotational velocity, the engine clutch 50 is engaged at last, and the engine 20 and the motor 40 drive the vehicle together (i.e., transition from an EV mode to an HEV mode).

Then, when a preset engine-off condition, such as a condition in which the hybrid vehicle is decelerating, is satisfied, the engine clutch 50 may be open and the engine 20 may be stopped (i.e., transition from an HEV mode to an EV mode).

In this case, the hybrid vehicle may charge a battery through the motor 40 using the driving force of a wheel, which is referred to as braking energy regeneration or regenerative braking.

Accordingly, the HSG 30 may function as a starter motor when the engine 20 is turned on and may function as a generator after the vehicle is turned on or when the vehicle is turned off and the rotation energy of the engine 20 is recovered.

Here, the HSG 30 may generate a large amount of heat during a driving and regenerative procedure of the hybrid vehicle, and in order to cool the HSG 30, a flow channel is configured with an inverter and the temperature of the HSG 30 may be controlled using an electric water pump (EWP) and coolant.

The performance characteristics of the HSG 30 may include intermittent charging and discharging, which is performed in a general driving mode, and forced battery charging, which is performed in an idle charging mode.

Here, in a general driving mode, the HSG 30 may have a limited torque sustain time due to intermittent torque application along with transition between HEV and EV modes, and thus active cooling may not be required due to slight heating.

On the other hand, in an idle charging mode, torque in a regenerative direction is maintained for a predetermined time, and thus the HSG 30 generates an increased amount of heat and needs to be actively cooled.

As such, the HSG 30 in the general driving mode and the idle charging mode has different thermal heating characteristics, and thus when cooling control of the HSG 30 is performed without consideration of the thermal heating characteristics of the respective modes, the service life of the HSG 30 may be reduced.

That is, in the idle charging mode of the HSG 30, when the possibility that the temperature of the HSG 30 is increased is not capable of being determined, the HSG 30 may experience a continuous change in temperature and may be susceptible to a dielectric breakdown condition due to degradation of durability.

According to the present disclosure, the HSG cooling control apparatus 10 may be disposed to effectively control cooling of the HSG 30 in consideration of the thermal heating characteristics of the idle charging mode of the HSG 30 and the thermal heating characteristics of the driving mode of the HSG 30.

The HSG cooling control apparatus 10 according to the present disclosure may include a receiver 100 for receiving driving information of the engine 20 and the HSG 30, a cooling unit 200 for cooling the HSG 30, and a controller 300 for control of driving of the cooling unit 200.

The controller 300 may be a processor (e.g., computer, microprocessor, CPU, ASIC, circuitry, logic circuits, etc.) that executes instructions of software by which various functions described hereinafter can be performed.

Here, the controller 300 may determine whether the HSG 30 is in an idle charging mode based on the driving information of the engine 20 and the HSG 30, when the HSG 30 is in the idle charging mode, the controller 300 may determine whether the temperature of the HSG 30 is greater than a first cooling-required temperature, and when the temperature of the HSG 30 is greater than the first cooling-required temperature, the controller 300 may control the cooling unit 200 to be turned on.

When the controller 300 determines whether the HSG 30 is in an idle charging mode, if the HSG 30 is not in the idle charging mode, the controller 300 may check whether the temperature of the HSG 30 is greater than a second cooling-required temperature, and when the temperature of the HSG 30 is greater than the second cooling-required temperature, the controller 300 may control the cooling unit 200 to be turned on.

In addition, when the controller 300 checks whether the temperature of the HSG 30 is greater than the second cooling-required temperature, if the temperature of the HSG 30 is not greater than the second cooling-required temperature, the controller 300 may control the cooling unit 200 to be turned off.

Then, when the controller 300 determines whether the temperature of the HSG 30 is greater than the first cooling-required temperature, if the temperature of the HSG 30 is not greater than the first cooling-required temperature, the controller 300 may control the cooling unit 200 to be turned off.

Here, the second cooling-required temperature may be greater than the first cooling-required temperature.

That is, the first cooling-required temperature may be a cooling-required temperature that is required when the HSG 30 is in the idle charging mode, and the second cooling-required temperature may be a cooling-required temperature that is required when the HSG 30 is in the driving mode.

As such, according to the present disclosure, cooling control of the HSG may be classified into a general driving mode and an idle charging mode, and when the general driving mode is executed, unnecessary driving energy of an electric water pump (EWP) may be reduced, and when the idle charging mode is executed, an increase in the temperature of the HSG may be prevented, thus increasing the service life of the HSG.

That is, according to the present disclosure, the service life of the HSG may be increased simply by changing logic, without an additional change in hardware.

Figure 2:
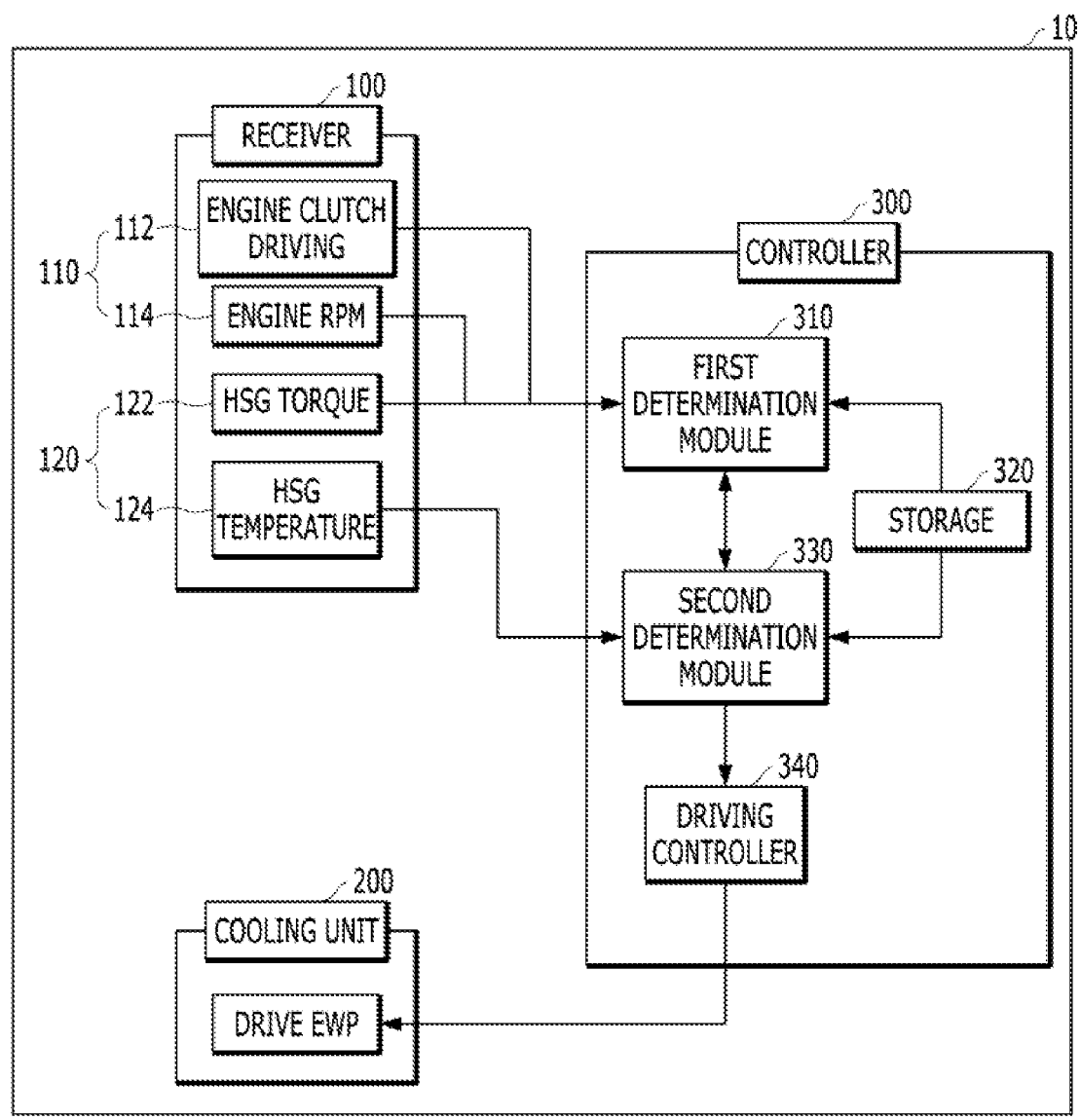
FIG. 2 is a block diagram for explanation of an HSG cooling control apparatus for a hybrid vehicle according to an exemplary embodiment of the present disclosure.

FIG. 2 is a block diagram for explanation of an HSG cooling control apparatus for a hybrid vehicle according to an exemplary embodiment of the present disclosure.

As shown in FIG. 2, the HSG cooling control apparatus according to the present disclosure may include the receiver 100 for receiving driving information of an engine and a hybrid starter and generator (HSG), the cooling unit 200 for cooling the HSG, and the controller 300 for control of driving of the cooling unit.

Here, the receiver 100 may receive engine driving information 110, including at least one of an engine clutch driving signal 112 and engine revolutions per minute (RPM) information 114, and HSG driving information 120, including at least one of HSG torque information 122 and HSG temperature 124.

The receiver 100 may be a hardware device implemented by various electronic circuits, e.g., a processor, to receive signals via wireless or wired connections.

The cooling unit 200 may include an electric water pump (EWP) but is not limited thereto.

In addition, the controller 300 may include a first determination module 310 for determining an idle charging mode of the HSG, a storage 320 for presetting and storing the first cooling-required temperature, a second determination module 330 for comparing the first cooling-required temperature with the temperature of the HSG in order to determine whether the HSG needs to be cooled, and a driving controller 340 for control of driving of the cooling unit 200 according to a determination by the second determination module 330.

Here, the storage 320 may further store the preset second cooling-required temperature.

In this case, the second cooling-required temperature may be greater than the first cooling-required temperature.

For example, the first cooling-required temperature may be a cooling-required temperature corresponding to the idle charging mode of the HSG, and the second cooling-required temperature may be a cooling-required temperature corresponding to the driving mode of the HSG.

The controller 300 configured as described above may determine whether the HSG is in an idle charging mode based on the engine and HSG driving information 110 and 120, when the HSG is in the idle charging mode, the controller 300 may determine whether the temperature of the HSG is greater than the first cooling-required temperature, and when the temperature of the HSG is greater than the first cooling-required temperature, the controller 300 may control the cooling unit 200 to be turned on.

Here, the controller 300 may determine whether the HSG is in the idle charging mode after the engine is driven.

When determining whether the HSG is in an idle charging mode, the controller 300 may check whether the engine clutch driving signal 112 is present in the engine driving information 110, when the engine clutch driving signal 112 is present therein, the controller 300 may check whether an engine clutch is in an inactivated state based on the engine clutch driving signal 112, and when the engine clutch is in an inactivated state, the controller 300 may determine that the HSG is in the idle charging mode.

As necessary, when determining whether the HSG is in an idle charging mode, the controller 300 may check whether the engine RPM information 114 is present in the engine driving information 110, when the engine RPM information 114 is present therein, the controller 300 may check whether the engine RPM is 0 based on the engine RPM information 114, and when the engine RPM is not 0, the controller 300 may determine that the HSG is in the idle charging mode.

In another case, when determining that the HSG is in an idle charging mode, the controller 300 may check whether the HSG torque information 122 is present in the HSG driving information 120, when the HSG torque information 122 is present therein, the controller 300 may check whether regenerative torque is applied to the HSG based on the HSG torque information 122, and when regenerative torque is applied to the HSG, the controller 300 may determine that the HSG is in the idle charging mode.

For example, when determining whether the HSG is in an idle charging mode, the controller 300 may check whether at least one of a first condition in which an engine clutch is in an inactivated state based on the engine and HSG driving information, a second condition in which the engine RPM is not 0, and a third condition in which regenerative torque is applied to the HSG is satisfied, and when at least one of the first, second, and third conditions is satisfied, the controller 300 may determine that the HSG is in the idle charging mode.

Here, when checking whether the first condition in which an engine clutch is in an inactivated state is satisfied, the controller 300 may check whether an engine clutch driving signal is present in engine driving information, when the engine clutch driving signal is present therein, the controller 300 may check whether the engine clutch is in an inactivated state based on the engine clutch driving signal, and when the engine clutch is in an inactivated state, the controller 300 may check that the first condition in which the engine clutch is in an inactivated state is satisfied.

When checking whether the second condition in which the engine RPM is not 0 is satisfied, the controller 300 may check whether engine RPM information is present in the engine driving information, when the engine RPM information is present therein, the controller 300 may check whether the engine RPM is 0 based on the engine RPM information, and when the engine RPM is not 0, the second condition in which the engine RPM is not 0 may be satisfied.

Then, when checking whether the third condition in which regenerative torque is applied to the HSG is satisfied, the controller 300 may check whether HSG torque information is present in HSG driving information, when the HSG torque information is present therein, the controller 300 may check whether regenerative torque is applied to the HSG based on the HSG torque information, and when the regenerative torque is applied to the HSG, the controller 300 may check that the third condition in which regenerative torque is applied to the HSG is satisfied.

In another example, when determining whether the HSG is in an idle charging mode, the controller 300 may check whether all of the first condition in which an engine clutch is in an inactivated state based on the engine and HSG driving information, the second condition in which the engine RPM is not 0, and the third condition in which regenerative torque is applied to the HSG are satisfied, and when all of the first, second, and third conditions are satisfied, the controller 300 may determine that the HSG is in the idle charging mode.

When the controller 300 determines whether the HSG is in an idle charging mode, if the HSG is not in the idle charging mode, the controller 300 may check whether the temperature of the HSG is greater than the second cooling-required temperature, and when the temperature of the HSG is greater than the second cooling-required temperature, the controller 300 may control the cooling unit 200 to be turned on.

Here, the second cooling-required temperature may be greater than the first cooling-required temperature.

In this case, the first cooling-required temperature may be a cooling-required temperature that is required when the HSG is in the idle charging mode, and the second cooling-required temperature may be a cooling-required temperature that is required when the HSG is in the driving mode.

For example, the first and second cooling-required temperature values may be temperature setting values that are preset and stored in the storage 320.

Then, when the controller 300 checks whether the temperature of the HSG is greater than the second cooling-required temperature, if the temperature of the HSG is not greater than the second cooling-required temperature, the controller 300 may control the cooling unit 200 to be turned off.

When determining whether the temperature of the HSG is greater than the first cooling-required temperature, the controller 300 may check whether HSG temperature information is present in the HSG driving information, and when the HSG temperature information is present therein, the controller 300 may determine whether the temperature of the HSG is greater than the first cooling-required temperature based on the HSG temperature information.

Here, the first cooling-required temperature may be a cooling-required temperature that is required when the HSG is in an idle charging mode.

Then, when the controller 300 determines whether the temperature of the HSG is greater than the first cooling-required temperature, if the temperature of the HSG is not greater than the first cooling-required temperature, the controller 300 may control the cooling unit 200 to be turned off.

As such, according to the present disclosure, an idle charging mode and the driving mode of the HSG may be differently determined, and cooling control corresponding to the idle charging mode or cooling control corresponding to the driving mode may be performed, thereby increasing the service life of the HSG.

According to the present disclosure, cooling control of the HSG may be classified into a general driving mode and an idle charging mode, and thus when the general driving mode is executed, unnecessary driving energy of an electric water pump (EWP) may be reduced, and when the idle charging mode is executed, an increase in the temperature of the HSG may be prevented, thus increasing the service life of the HSG.

That is, according to the present disclosure, the service life of the HSG may be increased simply by changing logic, without an additional change in hardware.

Figure 3:
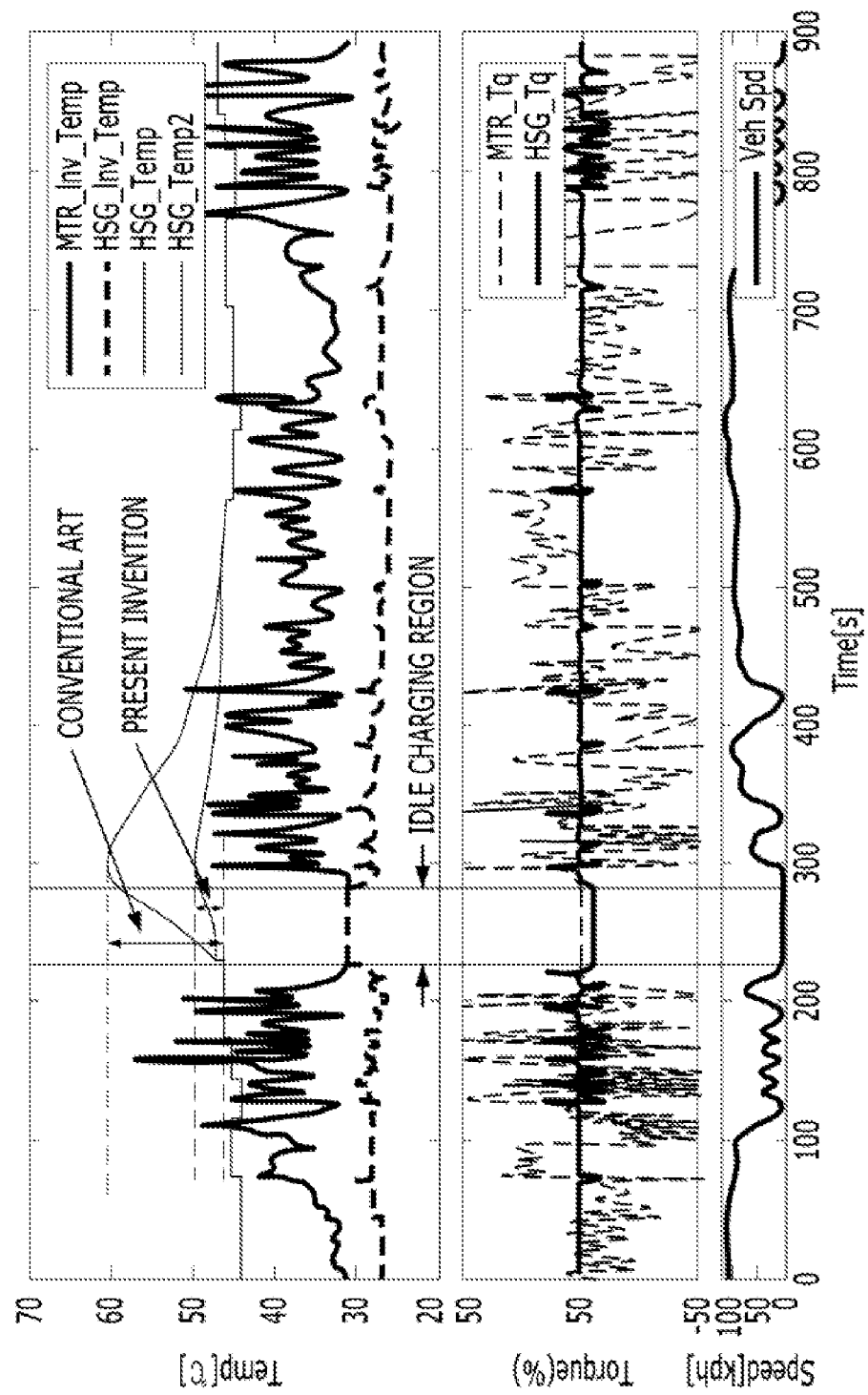
FIG. 3 is a graph showing a reduction in the temperature change of an HSG in an idle charging mode along with application of an HSG cooling control apparatus according to the present disclosure.

FIG. 3 is a graph showing a reduction in the temperature change of an HSG in an idle charging mode along with application of an HSG cooling control apparatus according to the present disclosure.

According to the present disclosure, as seen from FIG. 3, an effect of preventing a temperature change of the HSG in an idle charging mode may be achieved.

In a conventional cooling method, in order to prevent high-temperature derating, cooling logic is unified and applied in a high-temperature condition, and active cooling is not performed in the idle charging mode, and thus the temperature of the HSG may be increased.

On other hand, in the cooling method according to the present disclosure, continuous torque application (increase in temperature) in the idle charging mode may be predetermined and an electric water pump (EWP) may be pre-driven for cooling, and thus the magnitude of increase of the temperature of the HSG may be reduced, thus improving durability.

Figure 4:
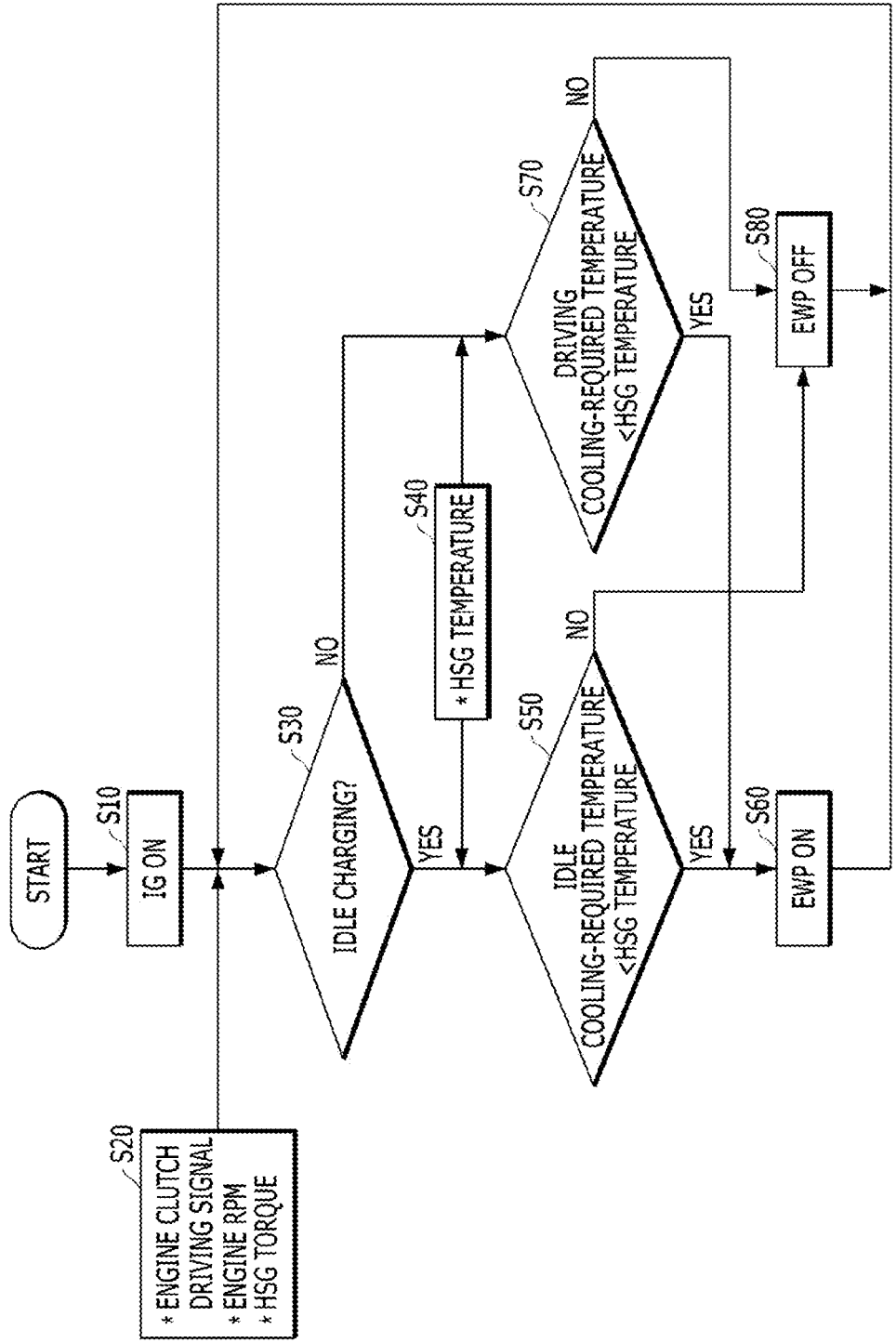
FIG. 4 is a flowchart for explanation of an HSG cooling control method of an HSG cooling control apparatus for a hybrid vehicle according to an exemplary embodiment of the present disclosure.

FIG. 4 is a flowchart for explanation of an HSG cooling control method of an HSG cooling control apparatus for a hybrid vehicle according to an exemplary embodiment of the present disclosure.

As shown in FIG. 4, when an engine is driven (S10), a controller according to the present disclosure may receive engine and HSG driving information (S20).

Here, when receiving the engine and HSG driving information, the controller may receive engine driving information, including at least one of an engine clutch driving signal and engine RPM information and HSG driving information, including at least one of HSG torque and HSG temperature.

The controller may determine whether the HSG is in an idle charging mode based on the engine and HSG driving information (S30).

For example, the controller may check whether at least one of a first condition in which an engine clutch is in an inactivated state based on the engine and HSG driving information, a second condition in which the engine RPM is not 0, and a third condition in which regenerative torque is applied to the HSG is satisfied, and when at least one of the first, second, and third conditions is satisfied, the controller may determine that the HSG is in the idle charging mode.

In another example, when determining whether the HSG is in an idle charging mode, the controller may check whether all of the first condition in which an engine clutch is in an inactivated state based on the engine and HSG driving information, the second condition in which the engine RPM is not 0, and the third condition in which regenerative torque is applied to the HSG are satisfied, and when all of the first, second, and third conditions are satisfied, the controller may determine that the HSG is in the idle charging mode.

Then, when the HSG is in the idle charging mode, the controller may receive HSG temperature information (S40) and may determine whether the temperature of the HSG is greater than the first cooling-required temperature (S50).

Here, when determining whether the temperature of the HSG is greater than the first cooling-required temperature, the controller may check whether the HSG temperature information is present in the HSG driving information, and when the HSG temperature information is present therein, the controller may determine whether the temperature of the HSG is greater than the first cooling-required temperature based on the HSG temperature information.

In this case, the first cooling-required temperature may be a cooling-required temperature that is required when the HSG is in an idle charging mode.

Then, when the temperature of the HSG is greater than the first cooling-required temperature, the controller may control the cooling unit to be turned on (S60).

Here, when the temperature of the HSG is not greater than the first cooling-required temperature, the controller may control the cooling unit to be turned off (S80).

When the controller determines whether the HSG is in an idle charging mode (S30), if the HSG is not in the idle charging mode, the controller may check whether the temperature of the HSG is greater than the second cooling-required temperature (S70), and when the temperature of the HSG is greater than the second cooling-required temperature, the controller may control the cooling unit to be turned on (S60).

Here, the second cooling-required temperature may be greater than the first cooling-required temperature.

In this case, the first cooling-required temperature may be a cooling-required temperature that is required when the HSG is in an idle charging mode, and the second cooling-required temperature may be a cooling-required temperature that is required when the HSG is in a driving mode.

For example, the first and second cooling-required temperatures values may be temperature setting values that are preset and stored.

Then, when the controller checks whether the temperature of the HSG is greater than the second cooling-required temperature (S70), if the temperature of the HSG is not greater than the second cooling-required temperature, the controller may control the cooling unit to be turned off (S80).

As such, according to the present disclosure, an idle charging mode and the driving mode of the HSG may be differentially determined, and cooling control corresponding to the idle charging mode or cooling control corresponding to the driving mode may be performed in order to increase the service life of the HSG.

Figure 5:
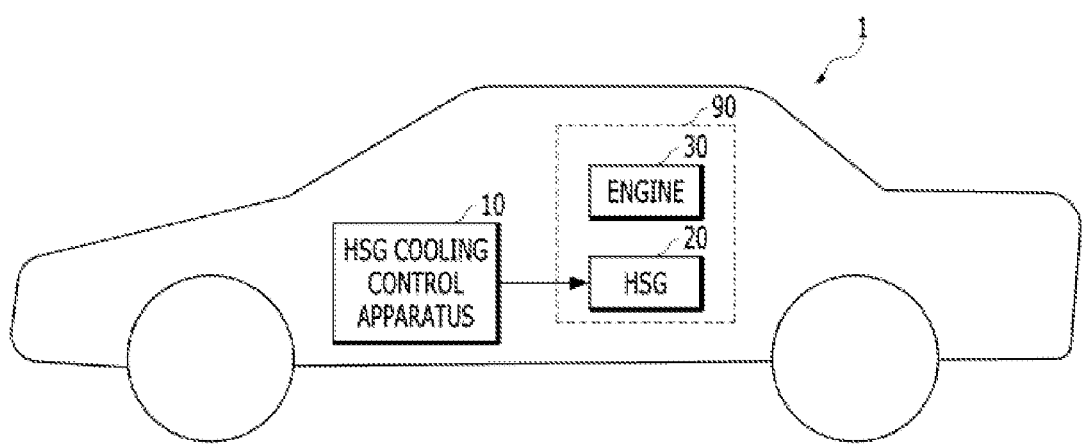
FIG. 5 is a schematic diagram for explanation of a hybrid vehicle including an output torque control apparatus according to an exemplary embodiment of the present disclosure.

FIG. 5 is a schematic diagram for explanation of a hybrid vehicle including an output torque control apparatus according to an exemplary embodiment of the present disclosure.

As shown in FIG. 5, a hybrid vehicle 1 according to the present disclosure may include a hybrid power source including a motor, an engine 30, and a hybrid starter and generator (HSG) 20, and the HSG cooling control apparatus 10 for control of cooling of the HSG 20.

Here, the HSG cooling control apparatus 10 may include a receiver for receiving driving information of the engine and the HSG, a cooling unit for cooling the HSG, and a controller for determining whether the HSG is in an idle charging mode based on the engine and HSG driving information, determining whether the temperature of the HSG is greater than the first cooling-required temperature when the HSG is in an idle charging mode, and controlling the cooling unit to be turned on when the temperature of the HSG is greater than the first cooling-required temperature.

According to the present disclosure, procedures provided by a control method of an HSG cooling control apparatus for a hybrid vehicle according to an exemplary embodiment of the present disclosure may be performed using a computer readable recording medium having recorded thereon a program for executing the control method of the HSG cooling control apparatus for the hybrid vehicle.

In the HSG cooling control apparatus for a hybrid vehicle, an HSG cooling control method thereof, and a hybrid vehicle including HSG cooling control apparatus according to at least one exemplary embodiment of the present disclosure configured as described above, an idle charging mode and the driving mode of the HSG may be differently determined, and cooling control corresponding to the idle charging mode or cooling control corresponding to the driving mode may be performed in order to increase the service life of the HSG.

According to the present disclosure, cooling control of the HSG may be classified into a general driving mode and an idle charging mode, and when the general driving mode is executed, unnecessary driving energy of an electric water pump (EWP) may be reduced, and when the idle charging mode is executed, an increase in the temperature of the HSG may be prevented to increase a service life of the HSG.

That is, according to the present disclosure, the service life of the HSG may be increased simply by changing logic without an additional change in hardware.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A hybrid starter and generator (HSG) cooling control apparatus for a hybrid vehicle, comprising:
   a receiver configured to receive driving information of an engine and a hybrid starter and generator (HSG);
   a cooling unit configured to cool the HSG; and
   a controller configured to control the cooling unit,
   wherein the controller determines whether the HSG is in an idle charging mode based on driving information of the engine and the HSG, determines whether a temperature of the HSG is greater than a first cooling-required temperature when the HSG is in the idle charging mode, and controls the cooling unit to be turned on when the temperature of the HSG is greater than the first cooling-required temperature.

2. The HSG cooling control apparatus of claim 1, wherein the receiver receives the driving information of the engine, which includes at least one of an engine clutch driving signal or an engine revolutions per minute (RPM), and the driving information of the HSG, which includes at least one of HSG torque or HSG temperature.

3. The HSG cooling control apparatus of claim 1, wherein the cooling unit includes an electric water pump (EWP).

4. The HSG cooling control apparatus of claim 1, wherein the controller determines whether the HSG is in the idle charging mode after the engine is driven.

5. The HSG cooling control apparatus of claim 1, wherein, when determining whether the HSG is in the idle charging mode, the controller checks whether an engine clutch driving signal is present in the driving information of the engine,
   wherein, when the engine clutch driving signal is present in the driving information of the engine, the controller checks whether the engine clutch is in an inactivated state based on the engine clutch driving signal, and
   wherein, when the engine clutch is in the inactivated state, the controller determines that the HSG is in the idle charging mode.

6. The HSG cooling control apparatus of claim 1, wherein, when determining whether the HSG is in the idle charging mode, the controller checks whether engine RPM information is present in the driving information of the engine,
   wherein, when the engine RPM information is present in the driving information of the engine, the controller checks whether the engine RPM is not 0 based on the engine RPM information, and
   wherein, when the engine RPM is not 0, the controller determines that the HSG is in the idle charging mode.

7. The HSG cooling control apparatus of claim 1, wherein, when determining whether the HSG is in the idle charging mode, the controller checks whether HSG torque information is present in the driving information of the HSG,
   wherein, when the HSG torque information is present in the driving information of the HSG, the controller checks whether regenerative torque is applied to the HSG based on the HSG torque information, and
   wherein, when the regenerative torque is applied to the HSG, the controller determines that the HSG is in the idle charging mode.

8. The HSG cooling control apparatus of claim 1, wherein, when determining whether the HSG is in the idle charging mode, the controller checks whether at least one of a first condition in which an engine clutch is in an inactivated state based on the driving information of the engine and the HSG, a second condition in which an engine revolutions per minute (RPM) is not 0, or a third condition in which regenerative torque is applied to the HSG is satisfied, and when at least one of the first, second, or third condition is satisfied, the controller determines that the HSG is in the idle charging mode.

9. The HSG cooling control apparatus of claim 1, wherein, when determining whether the HSG is in the idle charging mode, the controller checks whether all of a first condition in which an engine clutch is in an inactivated state based on the driving information of the engine and the HSG, a second condition in which an engine revolutions per minute (RPM) is not 0, and a third condition in which regenerative torque is applied to the HSG are satisfied, and when all of the first, second, and third conditions are satisfied, the controller determines that the HSG is in the idle charging mode.

10. The HSG cooling control apparatus of claim 1, wherein, when determining whether the HSG is in the idle charging mode, the controller checks whether the temperature of the HSG is greater than a second cooling-required temperature when the HSG is not in the idle charging mode, and the controller controls the cooling unit to be turned on when the temperature of the HSG is greater than the second cooling-required temperature.

11. The HSG cooling control apparatus of claim 1, wherein, when determining whether the temperature of the HSG is greater than the first cooling-required temperature, the controller checks whether HSG temperature information is present in the driving information of the HSG, and
wherein, when the HSG temperature information is present in the driving information of the HSG, the controller determines whether the temperature of the HSG is greater than the first cooling-required temperature based on the HSG temperature information.

12. The HSG cooling control apparatus of claim 1, wherein, when determining whether the temperature of the HSG is greater than the first cooling-required temperature, the controller controls the cooling unit to be turned off when the temperature of the HSG is not greater than the first cooling-required temperature.

13. A hybrid starter and generator (HSG) cooling control method for a hybrid vehicle comprising a receiver and a controller for control of driving of a cooling unit, the method comprising steps of:
receiving, by the receiver, driving information of an engine and driving information of an HSG;
determining, by the controller, whether the HSG is in an idle charging mode based on driving information of the engine and the HSG;
determining, by the controller, whether a temperature of the HSG is greater than a first cooling-required temperature when the HSG is in the idle charging mode; and
controlling, by the controller, the cooling unit to be turned on when the temperature of the HSG is greater than the first cooling-required temperature.

14. The method of claim 13, wherein the step of receiving driving information of an engine and an HSG includes receiving the driving information of the engine, which includes at least one of an engine clutch driving signal or an engine revolutions per minute (RPM), and the driving information of the HSG, which includes at least one of HSG torque or HSG temperature.

15. The method of claim 13, wherein the step of determining whether the HSG is in an idle charging mode includes:
checking whether an engine clutch driving signal is present in the driving information of the engine;
checking whether the engine clutch is in an inactivated state based on the engine clutch driving signal when the engine clutch driving signal is present in the driving information of the engine; and
determining that the HSG is in the idle charging mode when the engine clutch is in the inactivated state.

16. The method of claim 13, wherein the step of determining whether the HSG is in an idle charging mode includes:
checking whether engine revolutions per minute (RPM) information is present in the driving information of the engine;
checking whether the engine RPM information is not 0 based on the engine RPM information when the engine RPM information is present in the driving information of the engine; and
determining that the HSG is in the idle charging mode when the engine RPM is not 0.

17. The method of claim 13, wherein the step of determining whether the HSG is in an idle charging mode includes:
checking whether HSG torque information is present in the driving information of the HSG;
checking whether regenerative torque is applied to the HSG based on the HSG torque information when the HSG torque information is present the in the driving information of the HSG rein; and
determining that the HSG is in the idle charging mode when the regenerative torque is applied to the HSG.

18. The method of claim 13, wherein the step of determining whether the HSG is in an idle charging mode includes:
checking whether the temperature of the HSG is greater than a second cooling-required temperature when the HSG is not in the idle charging mode; and
controlling the cooling unit to be turned on when the temperature of the HSG is greater than the second cooling-required temperature.

19. The method of claim 13, wherein the step of determining whether a temperature of the HSG is greater than a first cooling-required temperature includes checking whether HSG temperature information is present in the driving information of the HSG, and determining whether the temperature of the HSG is greater than the first cooling-required temperature based on the HSG temperature information when the HSG temperature information is present in the driving information of the HSG.

20. The method of claim 13, wherein the step of determining whether a temperature of the HSG is greater than a first cooling-required temperature includes controlling the cooling unit to be turned off when the temperature of the HSG is not greater than the first cooling-required temperature.

* * * * *